United States Patent [19]

Etherton et al.

[11] Patent Number: 4,508,843

[45] Date of Patent: Apr. 2, 1985

[54] SUPPORTED POLYOLEFIN CATALYST FOR THE POLYMERIZATION OF ETHYLENE UNDER HIGH TEMPERATURES

[75] Inventors: Bradley P. Etherton; Anthony D. Hamer, both of Houston, Tex.

[73] Assignee: Exxon Research & Engineering Co., Florham Park, N.J.

[21] Appl. No.: 520,935

[22] Filed: Aug. 8, 1983

[51] Int. Cl.³ .............................................. C08F 4/64
[52] U.S. Cl. ................... 502/115; 502/108; 502/110; 502/116; 526/129; 526/133; 526/137; 526/144; 526/151
[58] Field of Search ............... 502/115, 116, 108, 110

[56] References Cited

U.S. PATENT DOCUMENTS

| | | | |
|---|---|---|---|
| 3,135,809 | 6/1964 | Bosmajian | 502/103 X |
| 4,173,547 | 11/1979 | Graff | 502/115 X |
| 4,324,691 | 4/1982 | Hartshorn et al. | 502/115 X |
| 4,325,835 | 4/1982 | Hartshorn et al. | 502/110 |
| 4,326,988 | 4/1982 | Welch et al. | 502/108 X |
| 4,335,229 | 6/1982 | Sakurai et al. | 502/115 X |
| 4,407,727 | 10/1983 | Harris et al. | 502/115 |

FOREIGN PATENT DOCUMENTS

| | | |
|---|---|---|
| 8617782 | 7/1982 | Australia . |
| 0032307 | 7/1981 | European Pat. Off. . |
| 0052471 | 5/1982 | European Pat. Off. . |
| 2090841 | 7/1972 | United Kingdom . |
| 2068007 | 8/1981 | United Kingdom . |

OTHER PUBLICATIONS

"The Role of Aluminum Alkyl Chlorides in Polymerization of Propylene with Titanium Chloride Catalysts", by A. D. Caunt, *Journal of Polymer Science*, Part C, vol. 4, No. 4, pp. 49–69, (1964).

*Primary Examiner*—Patrick Garvin
*Attorney, Agent, or Firm*—M. B. Kurtzman

[57] ABSTRACT

A catalyst component for polymerizing ethylene alone or with another alpha-olefin having from 3 to 18 carbon atoms at temperatures greater than about 150° C. which catalyst component is the product obtained by treating at least one dehydrated particulate support material, such as silica, having an average particle size from about 0.05 to about 20 microns, preferably 1.0 to 10.0 microns, with (a) at least one dihydrocarbyl magnesium compound wherein the hydrocarbyl groups can be the same or different, such as butyl ethyl magnesium,
(b) a transistion metal compound of Groups IVa, Va, or VIa of the Periodic Table, such as, for example, titanium tetrachloride, and (c) ethyl aluminum dichloride. In a preferred embodiment the particulate support material is treated with a halogenating agent prior to treatment with the transition metal compound. In a further preferred embodiment, the catalyst component is contacted under conventional polymerization conditions with a minor amount of an alpha-olefin having from 4 to 18 carbon atoms so as to provide a catalyst component comprising 5 to about 100 weight percent prepolymer.

20 Claims, No Drawings

SUPPORTED POLYOLEFIN CATALYST FOR THE POLYMERIZATION OF ETHYLENE UNDER HIGH TEMPERATURES

BACKGROUND OF THE INVENTION

The present invention relates to a supported catalyst useful for the polymerization of olefins and particularly ethylene under high temperatures and especially under high temperatures and pressures. The invention further relates to the process of polymerizing olefins and particularly ethylene in the presence of the supported catalyst.

The present invention especially relates to the polymerization of ethylene in the presence of the improved supported catalyst at temperatures higher than 150° C. without the need for deashing.

The polymerization of ethylene at high pressure, initiated by a peroxide capable of producing free radicals, has been known and used commercially for many years.

It is, furthermore, known to polymerize ethylene at a low pressure, by using a catalyst of the Ziegler-type, such as, for example, titanium trichloride and an alkyl aluminum compound.

More recently, catalyst components comprising the product obtained by treating a particulate support material, such as silica, with an organomagnesium compound and a transition metal compound and halogen type compounds have been found to be useful for polymerization of olefins under conventional polymerization conditions.

Many of these prior art high-efficiency Ziegler catalysts as described in the plethora of patent literature, have high productivities at a temperature range between 60° and 100° C. However, such high efficiency Ziegler catalysts normally rapidly decay at polymerization temperatures higher than 150° C., and making them unsuitable for use under high pressure, high temperature conditions because of the resulting poor productivity. The prior art high-efficiency Ziegler catalysts also are not especially useful for high pressure-high temperature polymerizations in, for example, a tubular reactor since such catalysts induce plugging and wear in fine tolerance catalyst feeding equipment.

Illustrative of such prior art is a published European Patent Application No. 0052471 assigned to Asahi Kasei Kogyo Kabushiki Kaisha, published European Patent Application Publication No. 0032307 assigned to Imperial Chemical Industries, Limited U.S. Pat. No. 4,173,547 of Graff, issued Nov. 6, 1979, U.K. published Patent Application No. 2068007 assigned to ACC Chemical Company, published U.K. Patent Application No. 2,090,841 assigned to Imperial Chemical Industries and published Australian Patent Application No. 86177/82 assigned to Societe Chim Des Charbonnages S.A. Each of the catalysts disclosed in these patents, although useful for the polymerization at high temperatures, evidence some disadvantages, such as, for example, the large size of the catalyst particles. Large catalyst size is a disadvantage with respect to pumping ease and settling problems at high temperature-pressure polymerizations.

It would be advantageous to develop a catalyst which can be usefully employed for the production of high density polyethylene or linear low-density polyethylene under high temperatures and especially high pressures, which catalyst would combine the properties of high activity, thereby eliminating the need for deashing the polymer product, a short lifetime of about less than 2 minutes, thereby eliminating or reducing the need for quenching agents as the polymer product egresses from the reactor, and the average particle size of the catalyst of less than approximately 7 microns, thereby facilitating catalyst pumping without settling and plugging problems at high pressures and without damaging pump seals.

SUMMARY OF THE INVENTION

The catalyst component and catalyst system of the present invention overcome many of the disadvantages of the prior art catalysts, such as those described, for example, in the above discussed art. The present invention provides a supported high efficiency catalyst component and catalyst systems for use in polymerization of olefins, particularly alpha-olefins and especially ethylene, at high temperatures and especially at high temperatures and high pressures. The catalyst component and system of this invention contain the following important advantages: the catalyst activity is sufficiently high thereby eliminating the need of deashing polymer product, the half-life of the catalyst is significantly short such that after two minutes residence time the catalyst activity is reduced to less than about 10 percent of its original activity thereby eliminating or reducing the need for quenching agents, the average particle size of the catalyst is approximately 7 microns thereby allowing formation of a stable suspension in light hydrocarbon solvents, facilitating catalyst pumping, and avoiding settling problems which normally occur with Ziegler-type catalysts at high pressures.

To achieve these objects in accordance with the purposes of this invention as broadly described herein there is provided a catalyst component obtained by treating at least one dehydrated particulate support material having an average particle size diameter of from about 0.05 to about 20 microns with;

(a) at least one dihydrocarbyl magnesium compound wherein the hydrocarbyl groups can be the same or different, (b) optionally, a chlorinating agent chosen from chlorosilanes, metal chlorides, and alkyl chlorides, $BCl_3$, $POCl_3$, and $SiCl_4$, (c) a transition metal compound of Groups IVa, Va, or VIa of the Periodic Table (56th Edition of Handbook of Chemistry and Physics CRC (1975)), (d) in the last treatment step, ethyl aluminum dichloride, and (e) optionally, prepolymerizing the catalyst component with an alpha-olefin containing 4 to 18 carbon atoms by treating the catalyst component with an organometallic compound of a metal from Group Ia to IIIa of the Periodic Table followed by treatment with the olefin.

In a preferred embodiment of the present invention, the support material is first treated with the dihydrocarbyl magnesium compound and prior to treatment with the transition metal compound, treated with a chlorinating agent.

In an especially preferred embodiment of the present invention, the catalyst component is prepolymerized with at least one alpha-olefin having from 4 to 18 carbon atoms, whereby there is provided a prepolymerized catalyst component comprising from about 5 to about 100 weight percent prepolymer on the basis of the dry, unprepolymerized catalyst and preferably 20 to about 60 weight percent.

The improved catalyst component of this invention is usefully employed for the polymerization of ethylene or for the copolymerization of ethylene with a higher alpha-olefin having from 3 to 12 carbon atoms under a temperature from about 150° C. to about 350° C. and from a pressure of about 10 to about 3,000 atmospheres.

There is further provided a highly efficient catalyst system for the polymerization of ethylene and copolymerization of ethylene with high alpha-olefins, said catalyst system comprising the improved catalyst component of this invention and an organometallic cocatalyst of a metal selected from Groups Ia, IIa and IIIa of the Periodic Table. The organometallic cocatalyst is preferably an organoaluminum compound, such as trialkyl aluminum, tetra-alkyl alumoxane, alkyl aluminum halide and alkyl aluminum hydride. However, organometallic cocatalysts wherein the metal is from Groups Ia to IIIa of the Periodic Table can be usefully employed.

The high pressure, high temperature catalyst systems described in the prior art are generally deficient in that they produce a large amount of low molecular ethylene oligomers that appear as waxes. Surprisingly, it has been found that use of alumoxanes, such as tetraisobutyl alumoxane, significantly decrease the extent of oligomer formation during the course of ethylene polymerization with the catalyst component of the present invention at high temperatures and high pressures. The most preferred cocatalyst is tetraisobutyl alumoxane.

The catalyst systems of the present invention as described above can be usefully employed for the polymerization of ethylene and copolymerization with higher alpha-olefins at temperatures in the range from about 120° to about 350° C. and pressures of from about 10 to about 3000 atmospheres.

The polymerization can be performed in accordance with a variety of techniques known for carrying out polymerization and/or copolymerization of ethylene under high temperatures and pressures. Thus, for example, it is possible to employ homogeneous stirred reactors. One can also employ a single tubular reactor wherein the reaction conditions are uniform, or one can employ a tubular reactor having a plurality of reactions zones at different temperatures, or one can employ several consecutive reactors in series.

The catalyst component of this invention evidences productivities of at least about 100 kilograms of polymer per gram of titanium and half-lives of about 5 to about 120 seconds at temperatures ranging from about 150° to 350° C. and pressures ranging from about 1000 to 3000 atmospheres. The half-life is defined as the width of the ethylene uptake curve at one-half of its maximum value. When catalyst is injected into the reactor, the ethylene flow rapidly increases to a maximum, then quickly decays to a low value. The half-life is a measure of the rate of this loss of activity at high temperatures.

It has been determined that the overall performance of the catalyst over the range of pressures described above is primarily a function of the reactor temperature. This means that the performance of the catalyst at high pressures and a specific temperature can be closely predicted from the performance at low pressure and the same temperature by linear extrapolation on the basis of monomer concentration, and vice versa.

Furthermore, the improved catalyst components of this invention evidences a reduced rate of settling after two hours upon shaking up a 5 or 10 weight percent slurry comprising the catalyst and inert hydrocarbon diluent.

In accordance with this invention, one can usefully polymerize ethylene to a high-density polyethylene or linear low-density polyethylene by copolymerizing ethylene with a minor amount of a higher alpha-olefin, such as butene-1. Elastomers prepared by copolymerizing ethylene and higher alpha-olefins having from 3 to 18 carbon atoms and copolymerization of ethylene and dienes can be readily prepared. Furthermore, one can homopolymerize olefins having from 3 to 12 carbon atoms. However, it is preferable to homopolymerize ethylene. Molecular weights can be simply controlled by means well known in the art, such as, for example, the use of $H_2$ during polymerization.

DETAILED DESCRIPTION OF THE INVENTION

The supported highly efficient catalyst component of the present invention comprises the reaction product obtained by treating a particulate support material having an average particle size of about 0.05 to about 20 microns, preferably 1.0 to 10.0 microns, with at least one dihydrocarbyl magnesium compound, wherein the hydrocarbyl groups can be the same or different, optionally a chlorinating agent, a transition metal compound of a Group IVb, Vb, or VIb metal of the Periodic Table and in the last treatment step, ethyl aluminum dichloride with an optional prepolymerization step following. Suitable particulate support materials are preferably inorganic oxide materials and include silica, alumina, silica-alumina and mixtures thereof. Other inorganic oxides that may be employed either alone or in combination with the silica, alumina or silica-alumina are magnesia, titania, zirconia and the like.

The metal oxides generally contain acidic surface hydroxyl groups which will react with the organometallic composition or the transition metal compound first added to the support material in a suitable reaction solvent. Prior to use, therefore, the inorganic oxide support material is dehydrated, i.e. subjected to treatment in order to remove water and reduce the concentration of the surface hydroxyl groups.

In an especially preferred embodiment of this invention, the inorganic particulate support material is dehydrated by means of chemical dehydrating agents. Surprisingly, the dehydrating agents and resultant products need not be removed and have no apparent effect on the catalyst performance. Chemical dehydration is advantageous in that it is mild and fairly slow and converts all water and hydroxyl groups on the silica surface to inert species. As the water is reacted, the pores of the support material are left filled with a low boiling hydrocarbon with low surface tension. The low boiling hydrocarbon is easily removed and causes no collapse of pores or loss of surface area. On the other hand, thermal dehydration at high temperatures can result in a surface area drop and a pore volume drop.

Chemical dehydrating agents are well known in the art; useful chemical agents are silicon tetrahalides, such as silicon tetrachloride, chlorosilanes, such as dimethyl dichlorosilane, trimethyl chlorosilane, methyl trichlorosilane, silylamines, such as trimethylsilylamine.

Chemical dehydration is accomplished by slurrying the inorganic particulate material, such as, for example, silica in an inert low boiling hydrocarbon, such as, for example, heptane. During the dehydration reaction, the silica should be maintained in a moisture and oxygen-free atmosphere. To the silica slurry is then added a low boiling inert hydrocarbon solution of the dehydrating agents, such as, for example, dichlorodimethylsilane. The solution is added slowly to the slurry. The temperature ranges during the dehydration reaction can be from about 25° C. to about 120° C. Higher and lower temperatures can be employed. Preferably, the temperature will be about 50° to 70° C. The dehydration reaction should be allowed to proceed until all the moisture is removed from the particulate support material, as indicated by cessation of gas evolution. Normally, the dehydration reaction will be allowed to proceed from about 30 minutes to about 16 hours, preferably 1 to 5 hours. Upon completion of the dehydration, the solid particulate material is filtered under a nitrogen atmosphere and washed one or more times with a dry, oxygen-free inert hydrocarbon solvent. The wash solvents, as well as the diluents employed to form the slurry and the solution of dehydrating agent, can be any hydrocarbon having a boiling point less than about 100° C. Illustrative of such hydrocarbons are heptane, hexane, toluene, isopentane and the like.

Dehydration can also be accomplished by means of thermal treatment. Generally, thermal treatment is carried out while purging with a dry inert gas, such as nitrogen, at a temperature of about 100° C. to about 1,000° C., and preferably, from about 300° C. to about 800° C. Pressure considerations are not critical. The duration of the thermal treatment can be from about 1 to about 24 hours. However, shorter or longer times can be employed. The temperature and length of time determine the amount of hydroxyl groups remaining on the surface of the inorganic oxide support.

The particulate inorganic oxide support material is preferably dehydrated by thermally treating the material under vacuum. The advantage of thermal treatment under vacuum is that the pores of the inorganic oxide material have less of a tendency to collapse and there is less modification of the surface.

In the dihydrocarbyl magnesium compound employed for the preparation of the catalyst component in accordance with the present invention the hydrocarbyl groups may be alkyl, aryl, cycloalkyl, aralkyl, alkadienyl or alkenyl. The number of carbon atoms in the hydrocarbyl group can be between 1 and 20. The number of carbon atoms is not critical. Nevertheless, it is preferable that the number of carbon atoms be between about 2 and 10. Illustrative examples of the magnesium compounds which can be employed in accordance with this invention are diethyl magnesium, di-n-propyl magnesium, di-isopropyl magnesium, di-n-butyl magnesium, di-isobutyl magnesium, diamyl magnesium, di-n-hexyl magnesium, diallyl magnesium, di-n-decyl magnesium, di-n-dodecyl magnesium, dicycloalkyl magnesium, such as dicyclopentyl magnesium and dicyclohexyl magnesium. The hydrocarbyl groups can be as listed above, the same or different, for example, butylethyl magnesium, butyl octyl magnesium, butyl cyclohexyl magnesium, n-butyl s-butyl magnesium, s-butyl t-butyl magnesium. Illustrative of the diaryl magnesium compounds, such as, for example, diphenyl magnesium, ditolyl magnesium, dixylyl magnesium. In accordance with this invention, the dialkyl magnesiums are preferably employed with butylethyl magnesium and butyloctyl magnesium being particularly preferred.

As purchased commercially, the dialkyl magnesium compounds which are soluble in hydrocarbons may contain some alkyl aluminum compound in order to reduce the viscosity of the solution. Illustrative of such Mg/Al compositions is $[(nC_4H_9)(C_2H_5)Mg][(C_2H_5)_3Al]_{0.02}$.

The hydrocarbon soluble magnesium compositions are known materials and can be prepared by conventional methods. One such method involves, for example, the addition of an appropriate aluminum alkyl to a solid dialkyl magnesium in the presence of an inert hydrocarbon. The organomagnesium-organoaluminum complexes are, for example, described in U.S. Pat. No. 3,737,393 which is incorporated herein by reference. However, any other suitable method for the preparation of the magnesium compounds can be suitably employed.

The magnesium compound can be transferred to the inorganic support material simply by providing a solution of the magnesium compound in an inert hydrocarbon or other suitable inert solvent and mixing it with the particulate support material under a nitrogen atmosphere in order to exclude moisture and air. The treatment temperature can be in the range of about 15° C. to about 50° C. However, higher and lower temperatures can be employed. The treatment time can be from about 30 minutes to about 16 hours, preferably from 1 to 5 hours.

The transition metal compound can be chosen from the Group IVb - VIb metals. The preferred compound has the formula $MO_p(OR)_mX_{n-2p-m}$ wherein M is the Group IVb - VIb metal with a valency of n=3, 4, or 5; 0 is oxygen; p is 0 or 1; R is an alkyl, aryl, cycloalkyl group or substituted derivative thereof, X is a halide and m is equal to, or greater than zero and less than or equal to n. The transition metal is generally selected from the group consisting of titanium, vanadium, chromium, and zirconium. It is preferred that the transition metal compound be soluble in an inert hydrocarbon. Illustrative examples of transition metals compounds which may be used in accordance with this invention are titanium tetrachloride, $Ti(OCH_3)Cl_3$, $Ti(OCH_2CH_3)Cl_3$, $Ti(OCH_2CH_2CH_2CH_3)_4$, $VCl_4$, $VOCl_3$, and $VO(OCH_3)Cl_2$. In the preferred embodiments of this invention, the transition metal is tetravalent titanium. In the most preferred embodiment, titanium tetrachloride is employed as the transition metal compound. The ratio of transition component to magnesium compound, (based on number of gram atoms) is $0.05 \leq Ti/Mg \leq 10$, preferably $0.1 \leq Ti/Mg \leq 1.0$.

The addition of the transition metal compound to the slurry containing the support and magnesium compound may be effected at temperatures from about 0° C. to about 100° C. The addition is conveniently carried out at ambient temperatures, i.e. from about 15° C. to about 30° C. The transition metal compound can in the case of $TiCl_4$, for example, be added as neat $TiCl_4$. The addition can also be made in the form of an inert hydrocarbon solution. The inert hydrocarbons that can be usefully employed are well known in the art, illustrative examples are those mentioned above.

In an especially preferred embodiment of this invention, prior to the addition of the transition metal compound, the particulate support material supporting the a magnesium compound is treated with a chlorinating agent. Any of the well known chlorinating agents may be usefully employed in accordance with this invention.

For example, halosilanes, such as SiCl$_4$, SiHCl$_3$, SiH$_2$Cl$_2$, Si(CH$_3$)$_3$Cl, SiRCl$_3$, SiR$_2$Cl$_2$, SiR$_2$Cl$_2$, wherein R is an alkyl group, aryl group, cycloalkyl group, aralkyl group, alkenyl group, having from 1 to 12 carbon atoms, such as, for example, chlorotriethylsilane, trichlorophenylsilane, trichlorocyclohexylsilane, trichlorotolylsilane, trichloroallylsilane; metal chlorides including alkyl metal chlorides, such as, ethyl aluminum dichloride, diethyl aluminum chloride, ethyl aluminum sesquichloride, boron trichloride, POCl$_3$, and SiCl$_4$; the alkyl chlorides, such as, for example, CCl$_4$, CHCl$_3$, CH$_2$Cl$_2$, benzyl chloride, t-butyl chloride and the like. The chlorinating compound, where one is used in the preparation of the solid catalyst component of the present invention, may be added directly to the slurry comprising the particulate support material and the magnesium compound or it may be added in an inert solvent, such as the inert hydrocarbon solvents mentioned above.

The treatment with the chlorinating agent should be from about 30 minutes to about 16 hours at a temperature from about −15° C. to about 50° C., preferably 1 to 5 hours.

The ratio of chlorinating agent to magnesium compound based on the atomic ratio of chlorine to magnesium is about $0 \leq Cl/Mg \leq 3$. In a preferred embodiment the ratio is $1.0 \leq Cl/Mg \leq 2.0$.

In order for high-temperature, high-pressure polymerization to be commercially useful, the catalyst half-life should be no more than about 36 seconds. With a half-life of about 36 seconds, the catalyst will have lost 90 percent of its activity after 2 minutes. Preferably, the catalyst's half-life will be in the range of about 10 to 20 seconds to insure the catalyst is deactivated prior to the egress of the polymer product from the reactor, thereby eliminating the need for expensive quenching steps and quenching agents.

It is the ethyl aluminum dichloride treatment of the catalyst component that causes the catalyst activity to greatly increase and causes the half-life of the catalyst component to narrow to about less than 20 seconds. This narrowing of half-life and increasing of catalyst activity was not achieved with any other final chlorinating agent. Other final chlorinating agents were observed to give acceptable activities. However, the catalyst component obtained thereby was fairly long-lived. With ethyl aluminum dichloride the catalyst component obtains a quick high ethylene uptake and a rapid decay rate.

The ratio of ethyl aluminum dichloride to magnesium compound based on the atomic ratios of chlorine to magnesium can be in the range of $0.1 \leq Cl/Mg \leq 10$ and preferably $0.1 \leq Cl/Mg \leq 2.0$. The treatment of the catalyst component with the ethyl aluminum dichloride can be from about 30 minutes to about 16 hours, preferably 1 to 5 hours, at a temperature in the range of about −15° C. to about 70° C. Preferably, ambient temperatures are employed, such as, from about 15° C. to about 50° C.

The ethyl aluminum dichloride treated catalyst component of this invention can also be prepolymerized by contacting the final catalyst component with an alpha-olefin having from 4 to 12 carbon atoms under polymerization conditions in order to form a prepolymerized catalyst component comprising from about 5 weight percent to about 100 weight percent and especially 20 weight percent to about 60 weight percent prepolymer. Illustrative but nonlimiting examples of the alpha-olefins which can usefully be employed to form the prepolymer of this invention are butene-1, hexene-1, octene-1, decene-1, 4-methylpentene-1 and the like.

The prepolymerization is performed in the presence of a cocatalyst. The cocatalyst employed in the prepolymerization can be the same or different from the cocatalyst employed in the formation of the catalyst system of this invention. Preferably, an organometallic cocatalyst is employed in the formation of the prepolymer, such as, for example, tri-n-hexyl aluminum, tri-n-octyl aluminum, tri-isobutyl aluminum, triethyl aluminum, and the like. Other organometallic cocatalysts can be employed in formation of the prepolymer, such as, for example, alkyl aluminums, alkyl aluminum halides, and the alkyl aluminum hydrides, alumoxanes, etc. The molar ratio of organometallic cocatalysts to titanium containing precursor catalyst component in the formation of the prepolymerized improved catalyst component of the invention is preferably 0.5 to about 4 moles of organoaluminum component to 1 gram - atom of titanium in the catalyst component.

The prepolymerization is preferably performed in slurry phase, hence, the catalyst component is added to an inert hydrocarbon solvent, such as hexane and the like. To the slurry is added the organoaluminum cocatalyst in an inert solvent which can be the same or different from that in which the catalyst is contained. The polymerizable alpha-olefin is thereafter added to the slurry and the mixture is maintained under conventional polymerization conditions well known to those of ordinary skill in the art.

The prepolymerized catalyst component then obtained will have an average particle size of much less 7 microns.

It is essential that the settling rate of a catalyst slurry in a light hydrocarbon be very slow relative to the flow rate through lines feeding a high pressure reactor. Settling will result in plugging of lines and erratic feeding. The small catalyst particle size combined with prepolymerization eliminates all settling concerns and results in a stable suspension of catalyst. In fact, it is very difficult to isolate the catalyst once it has been prepolymerized because of its small particle size. For that reason the catalyst is either used after prepolymerization without further treatment, or premixed with the organometallic component, then used.

The catalyst component of this invention is contacted with an organometallic cocatalyst. The cocatalyst can be a Group Ia to IIIa organometallic compound, preferably, the organometallic cocatalyst is selected from the group consisting of aluminum alkyls, alkyl aluminum halides, and alkyl aluminum hydrides and alumoxanes. Preferred cocatalysts are triethyl aluminum, tri-isobutyl aluminum, diethyl aluminum chloride, tri-n-hexyl aluminum, and alumoxanes. More preferably, tri-n-hexyl aluminum and tetraisobutyl alumoxane are preferred with tetraisobutyl alumoxane being the cocatalyst of choice. The molar ratio of organometallic cocatalyst to the prepolymerized titanium containing catalyst component of this invention is preferably in the range of about 5 to about 200 and especially about 15 to about 50.

The following examples illustrating certain embodiments of the present invention are intended only to illustrate the invention and are not to be construed in any limiting sense.

EXAMPLES

EXAMPLE 1

Catalyst Preparation 5.0 grams of Davison Syloid 221 (7 micron average particle diameter) were put into a 500 ml Schlenk flask which contained a magnetic stirring bar. The flask was sealed with a rubber septum and then carefully purged with nitrogen via its sidearm. The flask was purged slowly for 1 hour. The silica was slurried in 350 ml of dried, oxygen-free heptane. The heptane was dried by passage over an alumina column and storage over 4A molecular sieves. It was freed of oxygen by sparging with nitrogen for about 1 hour. The slurry was then heated to 70° C. in an oil bath and stirred with a magnetic stirrer.

A heptane solution of dimethyldichlorosilane at a concentration of 4.39 mmole/ml was prepared by mixing 31.8 ml of dimethyldichlorosilane with 28.2 ml of heptane. 35 ml of the solution was slowly added to the silica slurry over a period of 1.5 hours at 70° C. The solution was stirred for 3 hours at 70° C.

The treated silica was transferred to a dry box where it was filtered under nitrogen by vacuum filtration and then washed 6 times with dry, oxygen-free hexane. The sample was reslurried in 150 ml of dry, oxygen-free hexane in a 500 ml Schlenk flask and stoppered.

The flask was cooled to 15° by use of a cooling bath. While flowing nitrogen into the flask through the sidearm, the rubber septum was removed and a clean, dry, nitrogen-purged 30 ml dropping funnel with an equalizing tube was attached to the top of the flask. The following compounds were added dropwise to the flask while stirring: 7.48 mmole of butylethylmagnesium (BEM) in a 11.5 ml heptane solution, 4.95 mmole of trichlorosilane ($SiHCl_3$) in a 15.0 ml hexane solution, 1.75 mmole of titanium tetrachloride ($TiCl_4$ in a 3.5 ml hexane solution, and 10.05 mmole of ethylaluminum dichloride (EADC) in a 6.4 ml heptane solution. After each addition was complete, the flask was stirred for 1 hour at 15° C.

The catalyst was then taken into a dry box and filtered by vacuum filtration through a medium fritted Schlenk filter. The catalyst was washed twice with 50 ml aliquots of hexane and dried under vacuum. It was then stored in the dry box under nitrogen.

Polymerization

The polymerization was conducted in a 1 liter stirred autoclave. The reactor was heated to 230° C. and flushed with nitrogen in order to remove any water or oxygen present. It was then filled with 500 ml of dry, oxygen-free Isopar L (an isoparaffinic hydrocarbon, $C_{11}$-$C_{12}$). The background vapor pressure of the solvent was measured and the reactor pressured with ethylene to a total pressure of 450 psig. 0.54 ml of a 25 percent (w/w) solution of cocatalyst tri-n-hexylaluminum (TNHAL) in heptane and 0.025 g of catalyst slurried in 1.0 ml of Primol 355 (an inert mineral oil) was used in the polymerization (Al/Ti molar ratio of 50). The reaction was allowed to proceed for 5 minutes, after which the polymer was separated and collected. The ethylene uptake during the polymerization was monitored using a gas mass flowmeter which had previously been calibrated with a conventional wet test meter. The catalyst had an ethylene uptake profile which showed a very rapid initial ethylene uptake followed by what appears to be an exponential decay in activity. The half-width of the uptake curve was only 14.2 seconds showing the very rapid decay of the catalyst. The maximum specific activity of the catalyst was 1.07 kg of polymer/g of Ti.min.atmosphere of $C_2H_4$ pressure. The short half-width and high specific activity resulted in the very large total productivity of 13.62 kg of polyethylene/g Ti in 2 minutes. The productivity is stated in terms of 2 minutes because the average residence time in commercial high pressure reactors is approximately that long.

EXAMPLES 2 THROUGH 5 (COMPARATIVE)

These examples demonstrate the critical effect of an EADC addition as a final step. Four catalysts were prepared by addition of the listed ingredients to the silica.

Example 2: BEM addition, $TiCl_4$ addition

Example 3: BEM addition, $TiCl_4$ addition, EADC addition

Example 4: BEM addition, $SiHCl_3$ addition, $TiCl_4$ addition

Example 5: BEM addition, $SiHCl_3$ addition, $TiCl_4$ addition, EADC Addition

The silica was prepared similarly as in Example 1 with the exception that 10.0 grams of Davison Syloid 221 were placed in the 500 ml Schlenk flask, slurried in approximately 100 ml of dry, oxygen-free hexane, then treated with 6.0 ml of neat dimethyldichlorosilane added dropwise. The temperatures, stirring times, filtration, and drying procedures were otherwise the same.

Four 1.0 gram samples of the treated silica were placed in 50 ml centrifuge tubes along with stirring bars for the catalyst preparation. These were then treated with the reagents listed above. Each was added at 15° C. with one hour of stirring between each addition. After all of the additions had been made, the final catalysts were washed twice with 25 ml aliquots of hexane and dried. The compounds, concentrations, and quantities added are shown in Table I.

TABLE I

| Compound | Concentration (mmole/ml) | Quantity (ml) |
|---|---|---|
| BEM | 0.65 | 2.30 |
| $SiHCl_3$ | 0.33 | 1.00 |
| $TiCl_4$ | 0.50 | 0.70 |
| EADC | 1.57 | 1.29 |

Polymerizations were conducted in a manner identical to that described in Example 1, except that the reaction was initiated with 1.50 ml of a slurry containing 0.030 grams of the respective catalyst from Examples 2 through 5. The amount of cocatalyst used was 1.25 ml of TNHAL (6.3 percent (w/w) in heptane) to give an Al/Ti molar ratio of 25. The results of polymerizations using the catalysts prepared in Examples 2 through 5 are shown in Table IV. There is clearly a significant improvement in the catalyst productivity when EADC is used in the final chlorination step. In addition, one sees a significant decrease in the half-width of the reaction when EADC is used. The intermediate chlorination step also increases the catalyst productivity over catalysts not utilizing such an intermediate step.

EXAMPLES 6 AND 7

These examples demonstrate the effect of changing the chlorine levels in the first chlorination step.

24 grams of Syloid 221 were dehydrated at 600° C. under flowing nitrogen for 16 hours in a quartz tube. While being kept under nitrogen, the silica was transferred to a 500 ml Schlenk flask and stored. It was taken inside of a dry box and two 1.0 gram samples were placed into each of two clean, dry 50 ml centrifuge tubes equipped with stirring bars. The tubes were then sealed with septa and removed from the dry box. Because the samples had been thermally dehydrated, dimethyldichlorosilane was not added to the samples to remove water. Otherwise the chemicals added, the sequence of operations, the times and temperatures were the same as in Example 1, with the exception of the level of $SiHCl_3$ added. The concentrations and quantities of $SiHCl_3$ used in the catalyst preparation are shown in Table II.

TABLE II

| Example | Compound | Concentration (mmole/ml) | Quantity (ml) |
|---------|----------|--------------------------|---------------|
| 6 | $SiHCl_3$ | 0.33 | 1.00 |
| 7 | $SiHCl_3$ | 0.33 | 3.00 |

Polymerizations with catalysts prepared in Examples 6 and 7 were conducted in a manner identical to that described in Example 1. 0.5 ml of a catalyst slurry in hexane and 0.34 ml of TNHAL (25.5 percent (w/w) in heptane) were injected into the reactor. The results are shown in Table IV. As can be seen from Table IV, higher intermediate chlorination levels produce catalysts with a higher specific activity, although the half-width remains approximately constant.

EXAMPLES 8 AND 9

These examples demonstrate the effects of varying the EADC level in the final step of the catalyst preparation.

Catalysts were produced in a manner identical to Examples 6 and 7. The $SiHCl_3$ concentration was 0.33 mmole/ml. The only variation was in the amount of EADC and the temperature that was used in the final step. Table III lists the conditions used to make catalysts 8 and 9:

TABLE III

| Example | Concentration (mmole/ml) | Quantity (ml) | Temperature (°C.) |
|---------|--------------------------|---------------|-------------------|
| 8 | 1.57 | 0.32 | 25 |
| 9 | 1.57 | 1.27 | 25 |

The results of using catalysts made according to these examples for polymerizations of ethylene conducted in a manner identical to that as described in Example 1 are shown in Table IV.

In these examples the entire catalyst produced was slurried in 40 ml of hexane, then 1.0 ml of the appropriate catalyst slurry and 0.35 ml of TNHAL (25.2 percent (w/w) in heptane) were injected into the reactor.

As can be seen from Table IV, a decrease in the amount of EADC added to the reactor results in a decrease in the maximum specific activity and a broadening of the reaction half-width. Neither of these results are desirable from the point of view of commercial operation. Hence, a higher EADC amount during the final chlorination is preferred.

TABLE IV

| Example | Productivity[1] (kg/g Ti) | Max. Specific Activity (kg/g Ti · min · atm) | Half-Width (sec) |
|---------|---------------------------|---------------------------------------------|------------------|
| 1 | 13.62 | 1.07 | 14.2 |
| 2 | 0.97 | 0.05 | 26.0 |
| 3 | 7.08 | 0.49 | 17.5 |
| 4 | 1.77 | 0.07 | 40.1 |
| 5 | 9.32 | 0.70 | 17.0 |
| 6 | 28.69 | 2.04 | 17.7 |
| 7 | 31.78 | 2.70 | 16.5 |
| 8 | 5.64 | 0.50 | 15.3 |
| 9 | 11.80 | 1.21 | 13.0 |

[1] In 2 minutes

EXAMPLES 10 AND 11

These examples demonstrate the usefulness of the catalyst for high pressure polymerizations.

19.4 g of Aerosil 380 (Degussa) silica which had been dehydrated at 600° C. under vacuum for 16 hours was slurried in 225 ml of dry, oxygen-free hexane in a nitrogen atmosphere in a 500 ml Schlenk flask. To this was added dropwise 40.9 grams of 10.2 percent BEM in heptane (39.6 mmole BEM) with good agitation. The flask was stirred for one hour at room temperature. 10.6 rams of 25.9 percent (w/w) EADC in heptane was then added dropwise and stirred for one hour at room temperature. The fine white slurry was filtered, washed twice with hexane, and then reslurried in 300 ml of hexane. 11.9 ml of $TiCl_4$ in hexane at a concentration of 0.5 mmole/ml was then added to the slurry while stirring. After stirring for one hour at room temperature, 25 ml of 25.9 percent (w/w) EADC in heptane was added with good agitation and stirred for one hour at room temperature. The catalyst was filtered, washed twice with hexane, and dried under vacuum.

The polymerization was conducted in a 100 ml reactor at 230° C. and in the absence of solvent. The reactor was filled with the desired pressure of ethylene and then a premixed slurry of cocatalyst (TNHAL, 0.50 mmole/ml) and catalyst was injected into the reactor. The quantities of catalyst and cocatalyst were 1.5 mg of catalyst and $3.7 \times 10^{-3}$ mmole TNHAL. The catalyst and cocatalyst were slurried in Isopar L prior to injection into the reactor and were premixed for 22.5 minutes. At 1,000 and 1,200 bar, the catalysts had productivities of 148 and 274 kg/g Ti, respectively.

EXAMPLE 12

This example demonstrates the use of butyloctylmagnesium (BOMAG) and prepolymerization. A catalyst was prepared as follows: 3.0 g silica (Syloid 221) were weighed into a 125 ml vial under a nitrogen atmosphere and 50 ml of dry, oxygen-free hexane were added to the vial. While stirring, 1.8 ml dichlorodimethylsilane $(CH_3)_2SiCl_2$ were added at 65° C. The mixture was stirred for three hours at 65° C. and the solids allowed to settle over night. The supernatant liquid was decanted and replaced with an equal amount of fresh hexane after which 5.5 ml of a 20 percent weight solution of butyloctylmagnesium (BOMAG) in heptane was added. The mixture was then stirred for one hour at 15° C. after which 0.3 ml of trichlorosilane ($SiHCl_3$) was added and the mixture stirred again for one hour at 15° C. While stirring 1.06 ml of a $TiCl_4$ hexane solution (1.00 mmole/ml) was added and stirring was continued for one hour at 15° C. After that was added 3.9 ml of 25 weight percent EADC solution in heptane and the mixture stirred for 1 hour at 15° C. The catalyst was washed by decantation once and then prepolymerized with octene-1 in the presence of tri-n-octylaluminum (Al/Ti=2 mole) 38 weight percent octene-1 prepolymer based on the solid catalyst) for one hour at room temperature. The prepolymerized catalyst was then evaluated under the polymerization conditions employing TNHAL as the cocatalyst as described in Example 1. The results are shown in Table V.

EXAMPLES 13 AND 14

The above prepolymerized catalyst was evaluated under polymerization conditions as described above, but replacing TNHAL with DIBAL-O (diisobutylalumoxane), with an Al/Ti=25. In Example 13, the polymerization temperature was 220° C. and in Example 14 it was 180° C. Results are shown in Table V.

TABLE V

| Example | Reaction Temp. (°C.) | Cocatalyst | Productivity (KgPE/g Ti) | Half-Width (Sec) |
|---|---|---|---|---|
| 12 | 220 | TNHAL | 24.1 | 15.6 |
| 13 | 220 | DIBAL-O | 29.2 | 25.2 |
| 14 | 180 | DIBAL-O | 50.0 | 71.0 |

EXAMPLE 15

This example demonstrates the advantages of the preferred alumoxane cocatalyst. The 100 ml high pressure reactor described in Examples 10 and 11 was pressured to 1,000 bar at 230° C. with ethylene. 0.130 ml of a TNHAL solution (20% (w/w) in heptane) was injected into the reactor. 3.46 g of a liquid or waxy product consisting of $C_{12}$ to $C_{40}$ hydrocarbons was produced. When 0.130 ml of a diisobutylalumoxane (DIBAL-O) solution (20% (w/w) in heptane) was injected under identical conditions, 1.64 g of a nearly identical liquid or waxy $C_{12}$ to $C_{40}$ hydrocarbon product resulted. When used as the cocatalyst with the catalyst system described in this patent, alumoxanes will produce much less low molecular weight material and result in an improved utilization of ethylene over catalysts presently in use in high temperature reactors.

What is claimed is:

1. A catalyst component for (co)polymerizing ethylene at temperatures greater than about 150° C. which is the product obtained by treating at least one dehydrated particulate support material having an average particle size diameter of from about 0.05 to about 20 micron with
    (a) at least one dihydrocarbyl magnesium compound wherein the hydrocarbyl groups can be the same or different,
    (b) optionally, a chlorinating agent,
    (c) a transition metal compound of a Group IVb, Vb, or VIb metal of the Periodic Table, and as the last treatment step prior to optional step (e)
    (d) ethyl aluminum dichloride, and
    (e) optionally, prepolymerizing with an alpha-olefin containing 4 to 18 carbon atoms.

2. The catalyst component of claim 1 wherein the support material is treated with the dihydrocarbyl magnesium compound prior to treatment with the transition metal compound.

3. The catalyst component of claim 2 wherein the support material is treated with the chlorinating agent prior to treatment with the transition metal compound.

4. The catalyst component of claim 1 wherein the support material is silica and the transition metal compound is a tetra-valent titanium compound.

5. The catalyst component of claim 3 wherein the support material is silica, the transition metal compound is a tetra-valent titanium compound and the chlorinating agent is one of chlorosilanes, chlorohydrocarbons, alkyl metal chlorides, metal chlorides, $CCl_4$, $BCl_3$, $POCl_3$ and HCl.

6. The catalyst component of claim 1 wherein the silica has been chemically dehydrated.

7. The catalyst component of claim 1 wherein the silica is thermally dehydrated.

8. The catalyst component of claim 6 wherein the dihydrocarbyl magnesium compound is a dialkyl magnesium compound and the transition metal compound is titanium tetrachloride.

9. The catalyst component of claim 8 wherein the magnesium compound is one of butyl ethyl magnesium or butyl octyl magnesium.

10. The catalyst component of claim 1 wherein the catalyst component is prepolymerized with at least one alpha-olefin having from 4 to 18 carbon atoms thereby providing a catalyst component comprising from about 5 to about 100 weight percent prepolymer.

11. A catalyst system comprising the catalyst component of claim 1 and as a cocatalyst an organometallic compound of a metal of Groups Ia to IIIa.

12. A catalyst system comprising the catalyst component of claim 2 and as a cocatalyst an organometallic compound of a metal of Groups Ia to IIIa.

13. A catalyst system comprising the catalyst component of claim 3 and as a cocatalyst an organometallic compound of a metal of Groups Ia to IIIa.

14. A catalyst system comprising the catalyst component of claim 4 and as a cocatalyst an organometallic compound of a metal of Groups Ia to IIIa.

15. A catalyst system comprising the catalyst component of claim 5 and as a cocatalyst an organometallic compound of a metal of Groups Ia to IIIa.

16. A catalyst system comprising the catalyst component of claim 6 and as a cocatalyst an organometallic compound of a metal of Groups Ia to IIIa.

17. A catalyst system comprising the catalyst component of claim 7 and as a cocatalyst an organometallic compound of a metal of Groups Ia to IIIa.

18. A catalyst system comprising the catalyst component of claim 8 and as a cocatalyst an organometallic compound of a metal of Groups Ia to IIIa.

19. A catalyst system comprising the catalyst component of claim 9 and as a cocatalyst an organometallic compound of a metal of Groups Ia to IIIa.

20. A catalyst system comprising the catalyst component of claim 10 and as a cocatalyst an organometallic compound of a metal of Groups Ia to IIIa.

* * * * *